(12) United States Patent  
Ishiguro et al.

(10) Patent No.: US 9,746,618 B2  
(45) Date of Patent: Aug. 29, 2017

(54) L-ANGLE TYPE OPTICAL CONNECTOR

(71) Applicant: JAPAN AVIATION ELECTRONICS INDUSTRY, LIMITED, Tokyo (JP)

(72) Inventors: Masaki Ishiguro, Tokyo (JP); Hideto Shimazu, Tokyo (JP); Yuichi Koreeda, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 15/030,193

(22) PCT Filed: Aug. 18, 2014

(86) PCT No.: PCT/JP2014/071533  
§ 371 (c)(1),  
(2) Date: Apr. 18, 2016

(87) PCT Pub. No.: WO2015/098176  
PCT Pub. Date: Jul. 2, 2015

(65) Prior Publication Data  
US 2016/0252681 A1    Sep. 1, 2016

(30) Foreign Application Priority Data  
Dec. 27, 2013 (JP) ................. 2013-272498

(51) Int. Cl.  
*G02B 6/36* (2006.01)  
*G02B 6/38* (2006.01)

(52) U.S. Cl.  
CPC .......... *G02B 6/3829* (2013.01); *G02B 6/3885* (2013.01)

(58) Field of Classification Search  
None  
See application file for complete search history.

(56) References Cited

U.S. PATENT DOCUMENTS 5,160,811 A    11/1992  Ritzmann  
6,402,395 B1    6/2002  Bach  
(Continued)

FOREIGN PATENT DOCUMENTS

CN        102472873      5/2012  
EP        2 546 688      1/2013  
(Continued)

OTHER PUBLICATIONS

English translation of written opinion for PCT/JP2014/071533, mail date Nov. 18, 2014.*

(Continued)

*Primary Examiner* — Mike Stahl  
(74) *Attorney, Agent, or Firm* — Greenblum & Bernstein, P.L.C.

(57) ABSTRACT

In an L-angle type optical connector for bending an optical fiber in a right angle direction in wiring, an L-angle member which accommodates a bent portion, which is bent in a right angle direction, of the optical fiber has a cut-out spanning the entire length of the L-angle member along the inside of the bent portion, and a protrusion is formed on inner side surfaces, which sandwich the cut-out, of the L-angle member in a protruded manner. The member which accommodates the bent portion, which is bent in a right angle direction, of the optical fiber is constituted of one component.

8 Claims, 10 Drawing Sheets

(56) References Cited

U.S. PATENT DOCUMENTS

| | | |
|---|---|---|
| 6,485,194 B1 | 11/2002 | Shirakawa |
| 2001/0043775 A1 | 11/2001 | Shirakawa et al. |
| 2002/0141723 A1 | 10/2002 | Kent et al. |
| 2003/0236020 A1 | 12/2003 | Iamartino et al. |
| 2008/0273837 A1 | 11/2008 | Margolin et al. |
| 2012/0027357 A1* | 2/2012 | Rosenberg et al. .. G02B 6/3829 385/76 |

FOREIGN PATENT DOCUMENTS

| | | |
|---|---|---|
| JP | 3072405 | 7/2000 |
| JP | 2001-51151 | 2/2001 |
| JP | 2001-249253 | 9/2001 |
| JP | 2002-357752 | 12/2002 |
| JP | 2010-128112 | 6/2010 |
| JP | 4762858 | 6/2011 |
| JP | 2012-32725 | 2/2012 |

OTHER PUBLICATIONS

International Search Report for PCT/JP2014/071533 dated Nov. 18, 2014.
Official Action, along with English-language translation thereof, issued in CN Appl. No. 201480063888.1dated Nov. 1, 2016.
Office Action issued in Japan Counterpart Patent Appl. No. 2013-272498, dated Jun. 27, 2017, along with an english translation thereof.

* cited by examiner

L-ANGLE TYPE OPTICAL CONNECTOR

TECHNICAL FIELD

The present invention relates to an L-angle type optical connector for bending an optical fiber in a right angle direction in wiring.

BACKGROUND ART

Figures 1A, 1B:
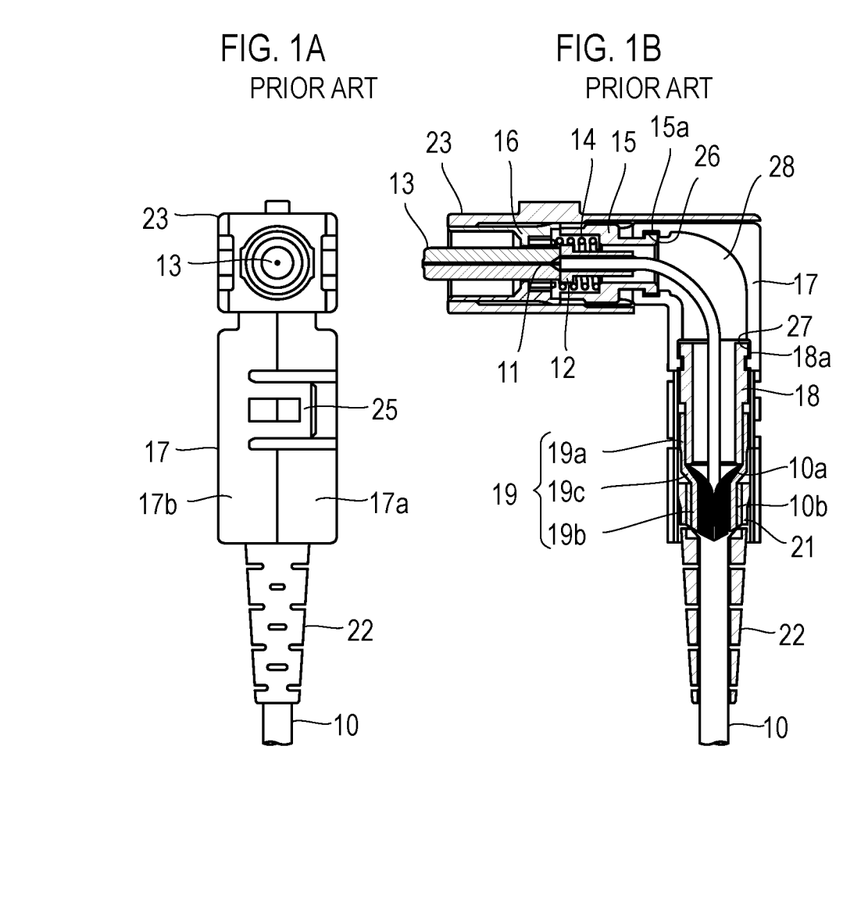
FIG. 1A is a front view illustrating a conventional example of an L-angle type optical connector.
FIG. 1B is a sectional view of the L-angle type optical connector illustrated in FIG. 1A.
Figure 1C:
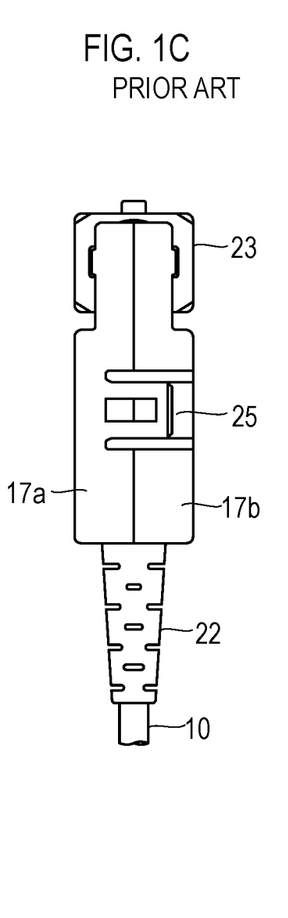
FIG. 1C is a rear view of the L-angle type optical connector illustrated in FIG. 1A.
Figure 2A:
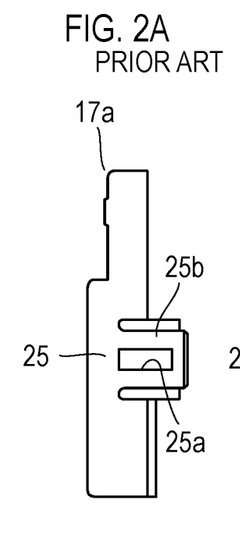
FIG. 2A is a rear view illustrating one half-body member of a right angle connection cylindrical member in FIG. 1A.
Figure 2B:
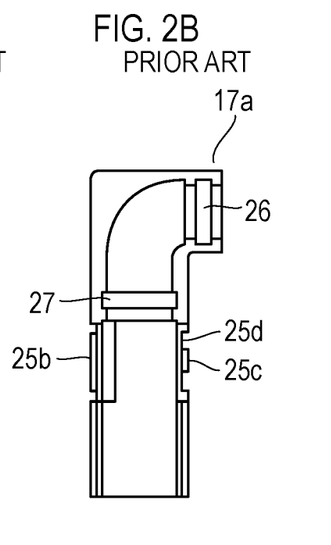
FIG. 2B is a side view of the half-body member illustrated in FIG. 2A.
Figure 2C:
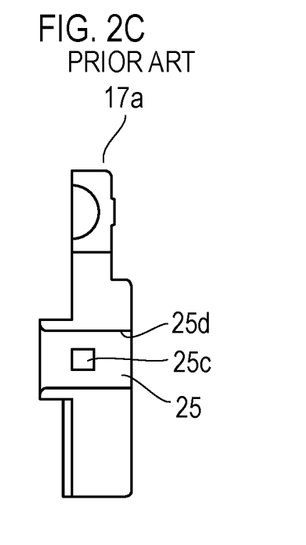
FIG. 2C is a front view of the half-body member illustrated in FIG. 2A.
Figure 3A:
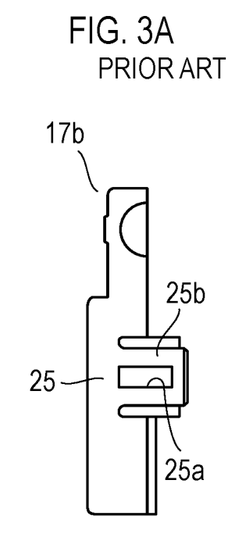
FIG. 3A is a front view illustrating the other half-body member of the right angle connection cylindrical member in FIG. 1A.
Figure 3B:
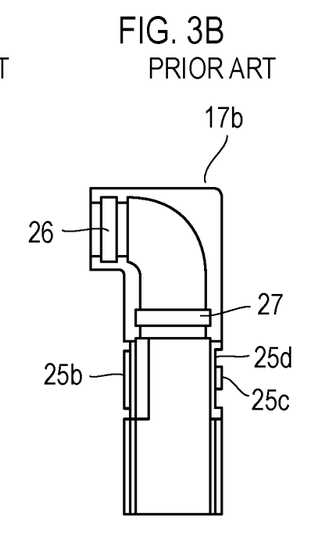
FIG. 3B is a side view of the half-body member illustrated in FIG. 3A.
Figure 3C:
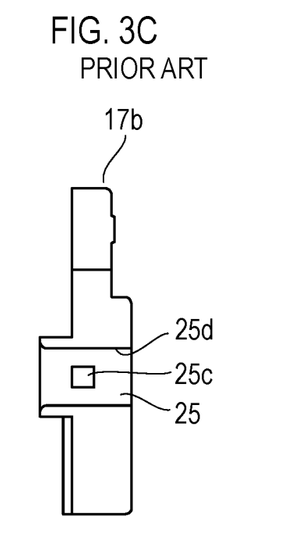
FIG. 3C is a rear view of the half-body member illustrated in FIG. 3A.

FIGS. 1A to 1C illustrate the constitution which is described in Patent Literature 1 as a conventional example of this type of L-angle type optical connector.

In this example, an optical connector is constituted of a ferrule 13 to which an optical fiber core wire 11 is inserted and fixed and which has a rear end to which a flange 12 is press-fitted, a stop ring 15 which supports a rear end of a spring 14 which abuts and contacts a rear end of a flange 12 to press the ferrule 13 to the front, a plug frame 16 which covers each of these members, a right angle connection cylindrical member 17 one end opening side of which is connected to the stop ring 15, a crimping base 18 which is fitted to an inside of the other end opening side of the right angle connection cylindrical member 17, a crimping seat 19 for fixing a Kevlar 10a which is an extension force line of an optical cable 10 to the crimping base 18, a crimping ring 21 for fixing a sheath 10b, which is a synthetic resin outer skin covering an outside of the Kevlar 10a of the optical cable 10, to the crimping seat 19, a boot 22 which is attached to the crimping ring 21, and a knob 23 which is covered on outsides of the plug frame 16 and the stop ring 15.

The right angle connection cylindrical member 17 is constituted of two half-body members 17a and 17b. These two half-body members 17a and 17b are matched with each other on opening sides thereof so as to be integrated by a click-fastening means 25.

The click-fastening means 25 integrates the two half-body members 17a and 17b such that a fitting protrusion 25b which is formed on a side surface of the half-body member 17a, which is one half-body member, in a protruded manner and has a fitting hole 25a in the center thereof is inserted into a groove portion 25d which is formed on a side surface of the half-body member 17b, which is the other half-body member, in a protruded manner and has a locking portion 25c, which has a protruded shape, in the center thereof, so as to fit the locking portions 25c in the fitting hole 25a, as illustrated in FIGS. 2A to 2C and FIGS. 3A to 3C. Here, the fitting protrusion 25b and the groove portion 25d are formed to be opposed to each other on the half-body member 17a which is one half-body member, and the groove portion 25d and the fitting protrusion 25b are formed to be opposed to each other on the half-body member 17b which is the other half-body member so as to be able to be associated and matched with the fitting protrusion 25b and the groove portion 25d of the half-body member 17a.

On a rear portion of the stop ring 15, an annular engagement convex portion 15a is formed. An annular engagement concave portion 26 which is formed on an inner circumferential portion of an opening end, on the shorter side, of the right angle connection cylindrical member 17 is fitted with the engagement convex portion 15a. Thus, the right angle connection cylindrical member 17 is connected and fixed to the rear portion of the stop ring 15.

In the inside of an opening end, on the longitudinal side, of the right angle connection cylindrical member 17, an annular engagement concave portion 27 is formed. By fitting an engagement convex portion 18a, which is formed on the crimping base 18 having a cylindrical shape in a protruded manner, to the engagement concave portion 27, the crimping base 18 is fixed to the right angle connection cylindrical member 17. Each of the crimping seat 19 and the crimping ring 21 is arranged on a rear end reduced diameter portion of the crimping base 18.

The crimping seat 19 is formed such that a front cylindrical portion 19a having a larger diameter and a rear cylindrical portion 19b having a smaller diameter are connected with each other via a step portion 19c. The front cylindrical portion 19a is fitted and attached to an outer circumference of the rear end reduced diameter portion of the crimping base 18 together with the Kevlar 10a of the optical cable 10. In a state in which the rear cylindrical portion 19b is covered by a cut end portion of the sheath 10b, the crimping ring 21 is fastened from the outside so as to fix the sheath 10b. On an outer circumference of the crimping ring 21, the boot 22 which holds the optical cable 10 is fitted and attached.

The knob 23 is attached to the plug frame 16, and a portion, which is bent at a right angle, of the right angle connection cylindrical member 17 is inserted and disposed in the knob 23. In the inside of a cylinder of the right angle connection cylindrical member 17, a bending space 28 which is large enough to allow the optical cable 10 to bend in a right angle direction is formed.

PRIOR ART LITERATURE

Patent Literature

Patent literature 1: Japanese Registered Patent No. 4762858

SUMMARY OF THE INVENTION

Problems to Be Solved By the Invention

In the optical connector described above, the right angle connection cylindrical member 17 for accommodating a portion, which is bent in the right angle direction, of the optical cable (the optical fiber) is constituted of two half-body members 17a and 17b, that is, constituted of two components. Therefore, the number of components is increased and an assembly step for assembling the two components (the half-body members 17a and 17b) is required.

An object of the present invention is to provide an L-angle type optical connector in which a member for accommodating a portion, which is bent in a right angle direction, of an optical fiber can be constituted of one component and in this respect, the number of components and the number of assembly steps can be reduced.

Means to Solve the Problems

According to the present invention, in an L-angle type optical connector for bending an optical fiber in a right angle direction in wiring , an L-angle member which accommodates a bent portion, which is bent in the right angle direction, of the optical fiber has a cut-out spanning an entire length of the L-angle member along an inside of the bent portion, and a protrusion is formed on inner side surfaces, which sandwich the cut-out, of the L-angle member in a protruded manner.

Effects of the Invention

According to the L-angle type optical connector of the present invention, the member which accommodates the portion, which is bent in the right angle direction, of the optical fiber is constituted of one component, so that the number of components can be reduced and the number of assembly steps can be also reduced in comparison with a conventional two component constitution.

DETAILED DESCRIPTION OF THE EMBODIMENTS

An embodiment of the present invention will be described below.

Figure 4A:
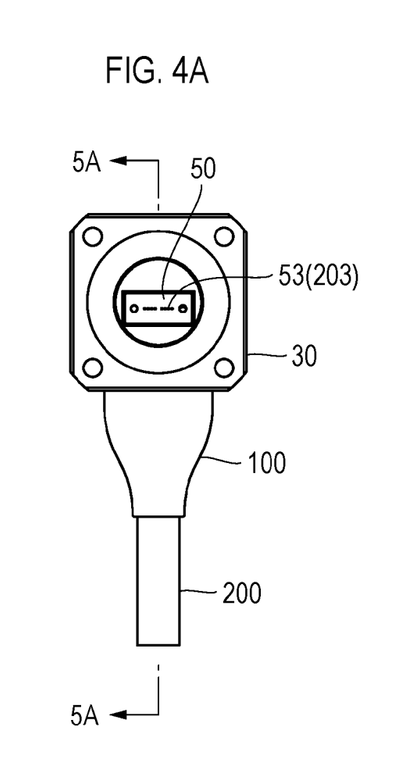
FIG. 4A is a front view illustrating an L-angle type optical connector according to an embodiment of the present invention.
Figure 4B:
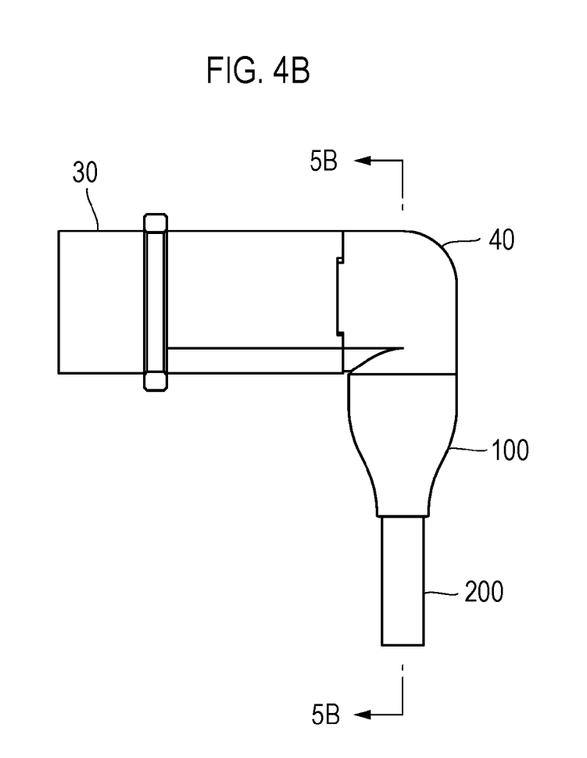
FIG. 4B is a side view of the L-angle type optical connector illustrated in FIG. 4A.
Figure 4C:
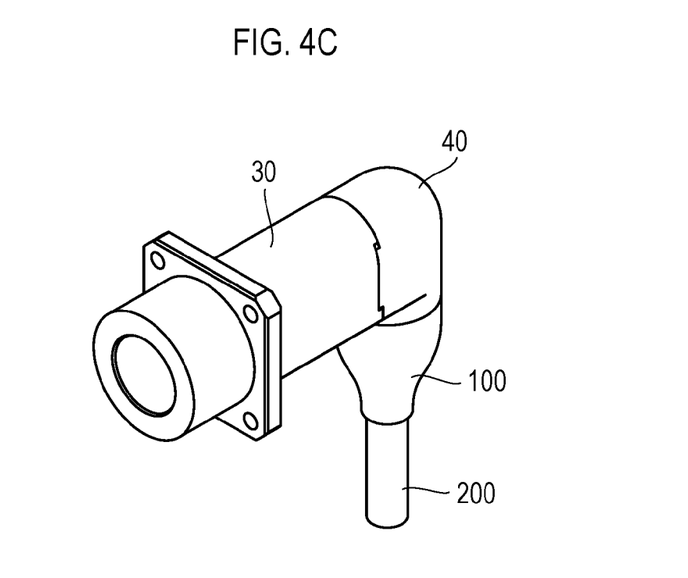
FIG. 4C is a perspective view of the L-angle type optical connector illustrated in FIG. 4A.
Figure 5A:
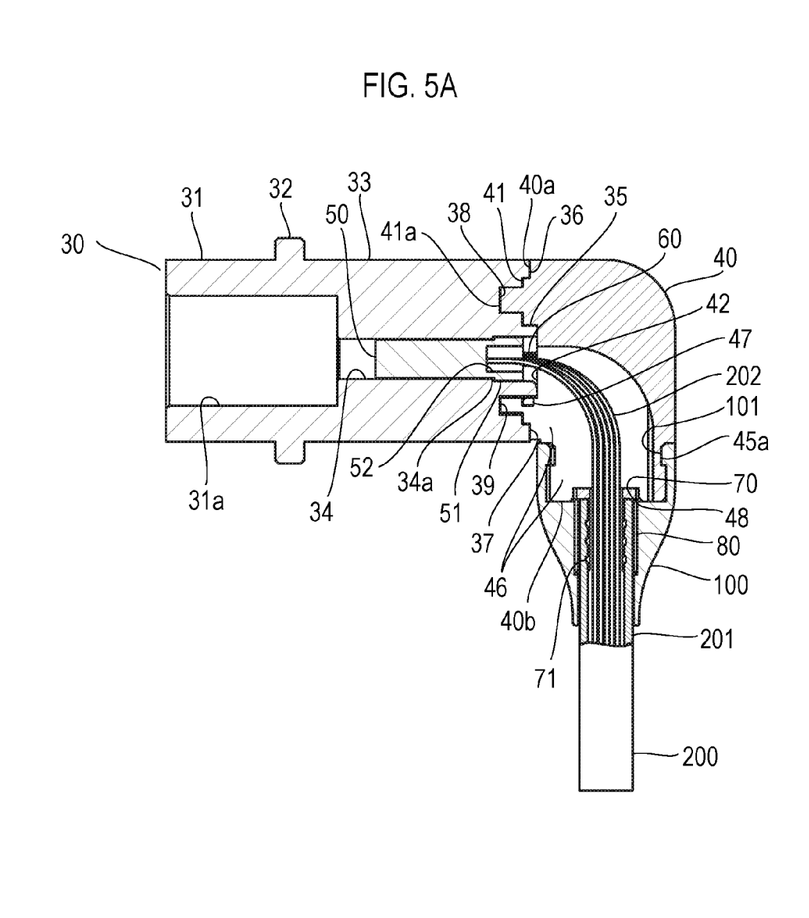
FIG. 5A is an enlarged sectional view taken along a 5A-5A line of FIG. 4A.
Figure 5B:
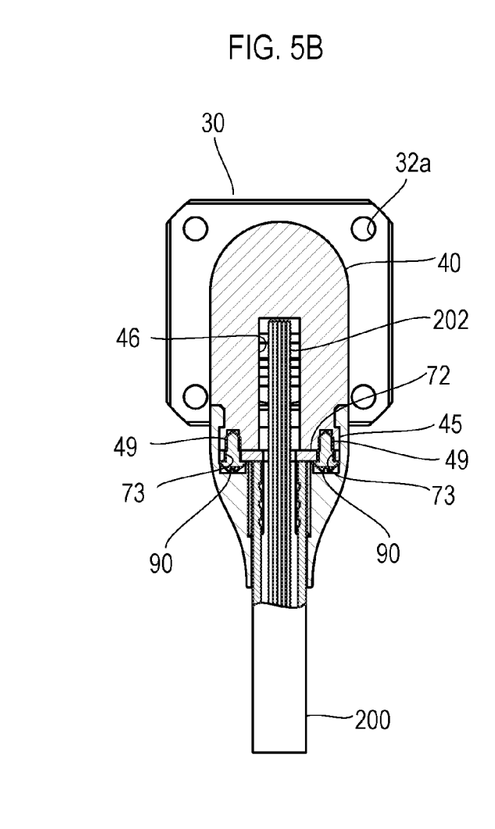
FIG. 5B is an enlarged sectional view taken along a 5B-5B line of FIG. 4B.
Figure 6A:
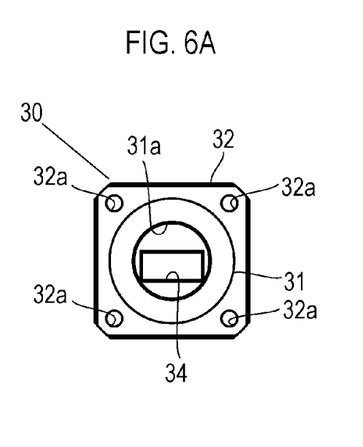
FIG. 6A is a front view illustrating a shell in FIG. 4C.
Figure 6B:
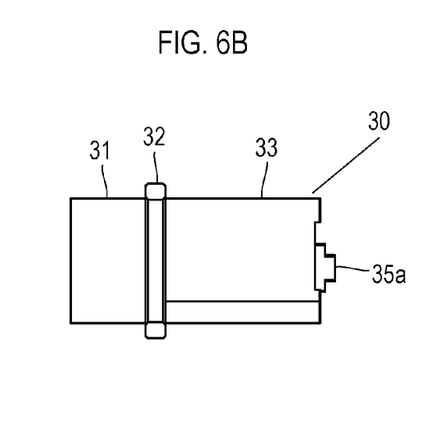
FIG. 6B is a side view of the shell illustrated in FIG. 6A.
Figure 6C:
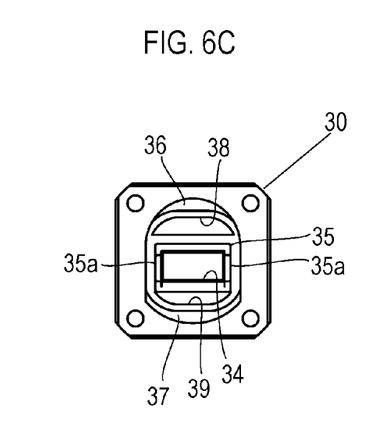
FIG. 6C is a rear view of the shell illustrated in FIG. 6A.
Figure 6D:
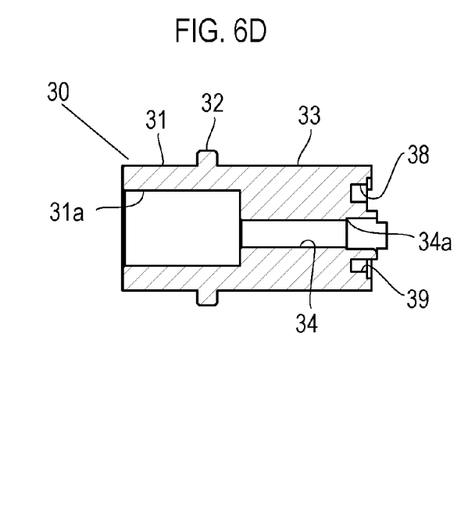
FIG. 6D is a sectional view of the shell illustrated in FIG. 6A.
Figure 6E:
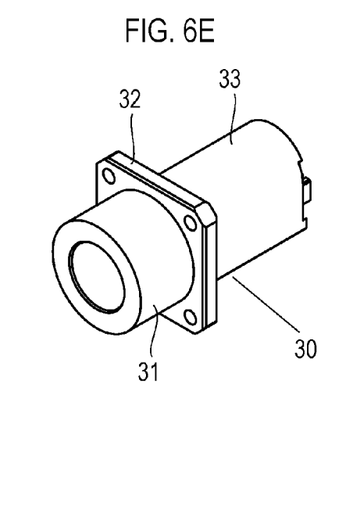
FIG. 6E is a perspective view of the shell illustrated in FIG. 6A.
Figure 6F:
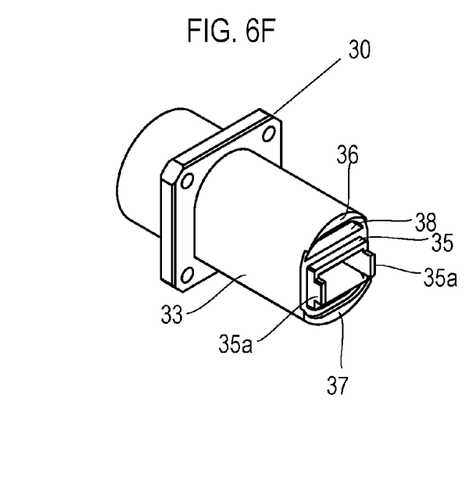
FIG. 6F is a perspective view of the shell illustrated in FIG. 6A.
Figure 7A:
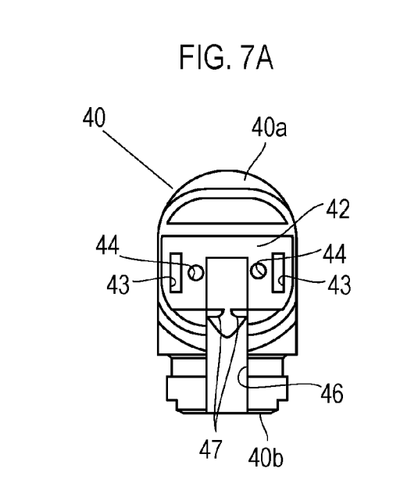
FIG. 7A is a front view illustrating an L-angle member in FIG. 4C.
Figure 7B:
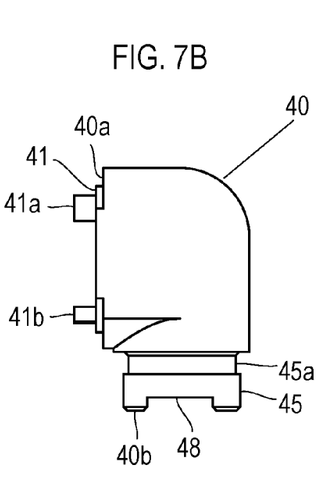
FIG. 7B is a side view of the L-angle member illustrated in FIG. 7A.
Figure 7C:
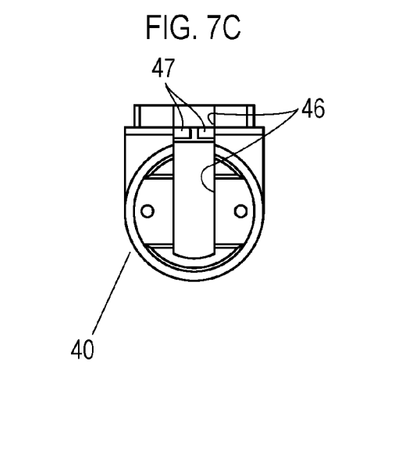
FIG. 7C is a bottom view of the L-angle member illustrated in FIG. 7A.
Figure 7D:
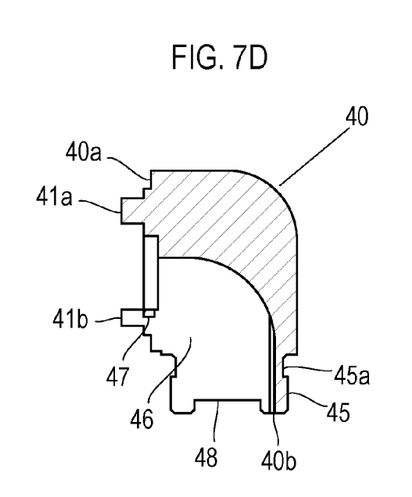
FIG. 7D is a sectional view of the L-angle member illustrated in FIG. 7A.
Figure 7E:
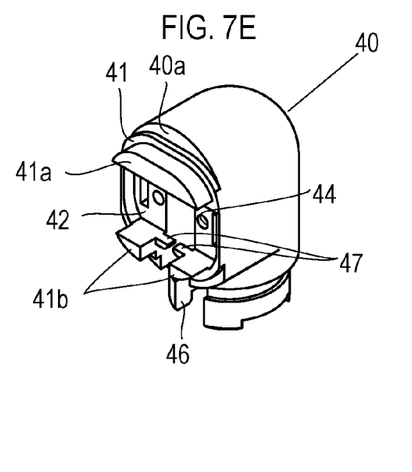
FIG. 7E is a perspective view of the L-angle member illustrated in FIG. 7A.
Figure 7F:
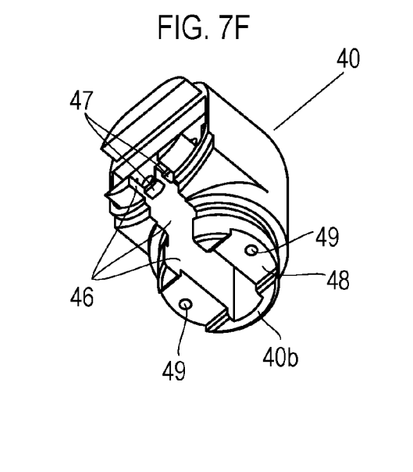
FIG. 7F is a perspective view of the L-angle member illustrated in FIG. 7A.

FIGS. 4A to 4C illustrate an outer appearance of an L-angle type optical connector according to the embodiment of the present invention, and FIGS. 5A and 5B illustrate a cross section structure of the L-angle type optical connector. In this example, the L-angle type optical connector is constituted of a shell 30, an L-angle member 40, a ferrule 50, a coil spring 60, a sleeve 70, a crimping ring 80, screws 90, and a boot 100. In FIGS. 4A to 4C and FIGS. 5A and 5B, 200 denotes an optical cable.

Structures of respective components are first described.

As illustrated in FIGS. 6A to 6F, the shell 30 is constituted of a cylindrical portion 31, a flange portion 32 which is provided on a rear end of the cylindrical portion 31 and has a rectangular shape, and an extended portion 33 which is formed in a manner to be extended to the rear side from the flange portion 32. Four corner portions of the flange portion 32 are chamfered and holes 32a used for attachment and fixation are formed on the four corner portions respectively.

The extended portion 33 has an approximately-elliptic cylindrical shape, and a rectangular hole 34 which communicates with an inner space 31a of the cylindrical portion 31 is formed in a manner to penetrate in the axial direction of the extended portion 33. The rectangular hole 34 is a stepped hole which has a step portion 34a on a rear end side thereof and the rear side from the step portion 34a is a slightly larger hole. A communicating portion between the inner space 31a of the cylindrical portion 31 and the rectangular hole 34 is positioned slightly closer to the extended portion 33.

On a rear end surface of the extended portion 33, a frame portion 35 which has a rectangular frame shape is formed in a protruded manner so as to surround the rectangular hole 34, and a pair of protruded pieces 35a is further formed in a protruded manner from a pair of short sides, which are opposed to each other, of the frame portion 35. Further, on an upper end portion and a lower end portion, which sandwich the frame portion 35, of the rear end surface of the extended portion 33, protruded portions 36 and 37 respectively having outer surfaces which are accorded with the outer surface of the extended portion 33 are formed respectively. Between the protruded portion 36 and the frame portion 35 and between the protruded portion 37 and the frame portion 35, concave portions 38 and 39 which have an arcuate shape are formed respectively.

The L-angle member 40 has a shape as that illustrated in FIGS. 7A to 7F and one end surface 40a and the other end surface 40b are positioned to be orthogonal to each other. One end surface 40a is an attaching surface of the shell 30 and an outer shape of one end surface 40a is accorded with an outer shape of the extended portion 33 of the shell 30.

On one end surface 40a, a step portion 41 which is raised and shaped to be fitted between the protruded portions 36 and 37 of the shell 30 is formed, and protruded portions 41a and 41b which are respectively fitted in the concave portions 38 and 39 of the shell 30 are further formed on the step portion 41 in a protruded manner. Between the protruded portions 41a and 41b, a large dent 42 is formed on the step portion 41. A pair of concave portions 43 which have a slit shape is formed on a bottom surface of the dent 42, and a pair of circular concave portions 44 is further formed on inner sides of these concave portions 43.

On the other hand, a shaft portion 45 having a circular outer shape is provided on the other end surface 40b side and the other end surface 40b is positioned at an end of the shaft portion 45. The other end surface 40b is an attaching surface of the sleeve 70, the optical cable 200, and the like.

In the L-angle member 40, a cut-out 46 is formed on the inner circumference side from one end surface 40a to the other end surface 40b to span the entire length of the L-angle member 40, and the protruded portion 41b is also divided into two portions by the cut-out 46. The cut-out 46 has the depth to reach the vicinity of an outer circumferential surface of the opposite side in the shaft portion 45 and has the depth beyond the center of one end surface 40a on the one end surface 40a side, and an inner bottom surface of the cut-out 46 is curved to form an arc shape from one end surface 40a to the shaft portion 45.

The cut-out 46 is formed in the L-angle member 40 as described above and protrusions are formed in a protruded manner on inner side surfaces which sandwich the cut-out 46. Protrusions 47 are respectively provided, in a pair, on the inner side surfaces, which sandwich the cut-out 46, of the protruded portions 41b to be opposed to each other, in this example. A pair of protrusions 47 is provided on a base end portion of the protruded portions 41b and a predetermined gap is provided between ends of the protrusions 47.

On the other end surface 40b (on an end surface of the shaft portion 45), a groove 48 is provided in a direction orthogonal to the depth direction of the cut-out 46, and screw holes 49 are respectively formed on both grooves 48 obtained such that the groove 48 is divided into two portions by the cut-out 46. Further, on the outer circumferential surface of the shaft portion 45, a concave portion 45a is annularly provided.

Figure 8:
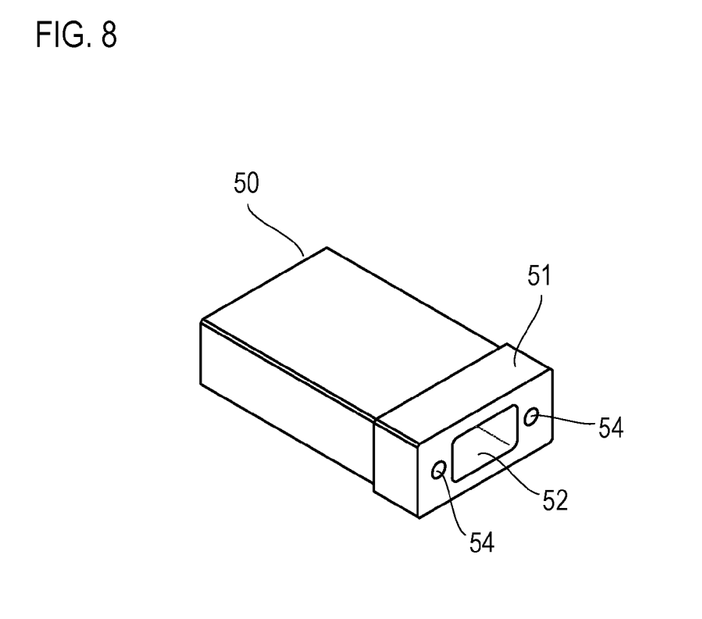
FIG. 8 is a perspective view illustrating a ferrule in FIG. 4A.

The ferrule 50 has a rectangular parallelepiped shape as illustrated in FIG. 8. On one end side of the ferrule 50, a flange portion 51 which has an outer shape slightly expanded over the entire circumference is formed. A concave portion 52 is formed on an end surface on the side, on which the flange portion 51 is formed, of the ferrule 50 and fine holes 53 (refer to FIG. 4A) which communicate with the concave portion 52 are formed to be aligned on the end surface of the ferrule 50. In this example, eight fine holes 53 are formed to be aligned on a straight line as illustrated in FIG. 4A. Further, pin holes 54 are formed in a penetrating manner respectively on both sides which sandwich the alignment of the fine holes 53. To these pin holes 54, pins which are provided to a counterpart ferrule which is abutted and connected to the end surface of this ferrule 50 are inserted.

Figure 9:
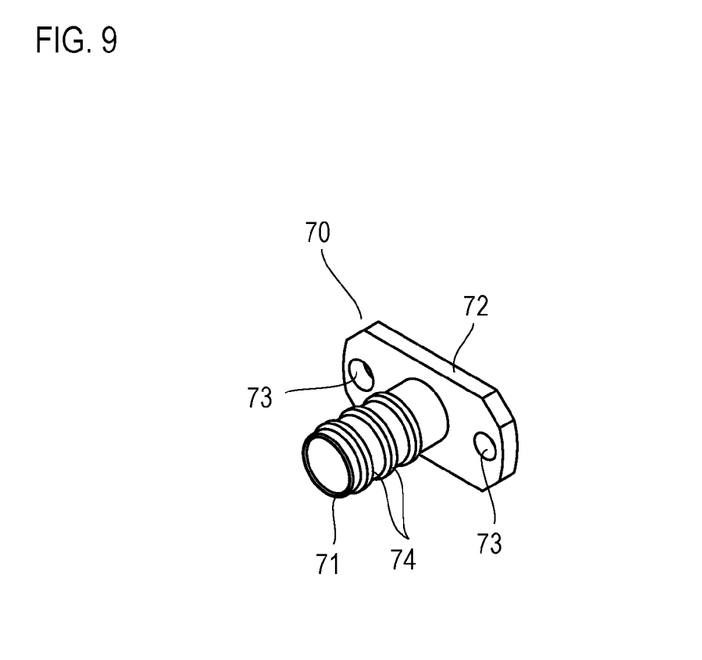
FIG. 9 is a perspective view illustrating a sleeve in FIG. 5A.
Figure 10A:
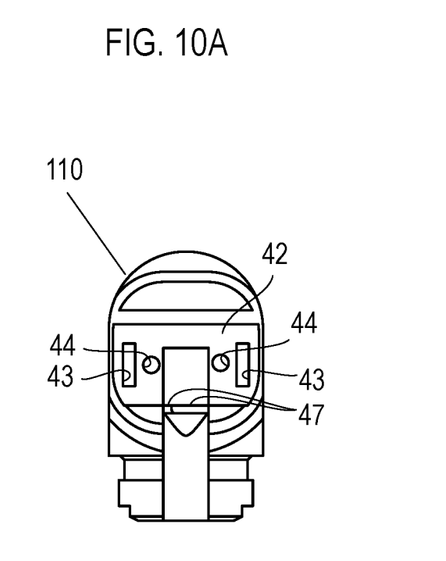
FIG. 10A is a front view illustrating another shape example (example 1) of the L-angle member.
Figure 10B:
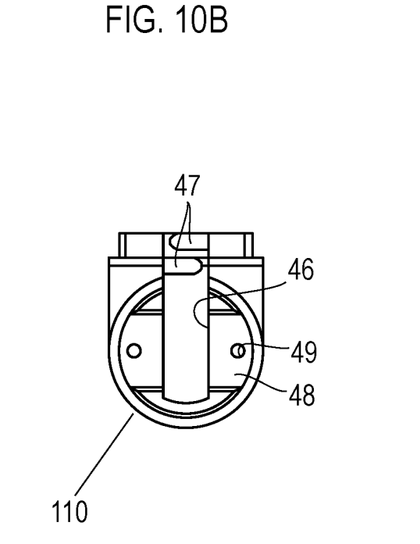
FIG. 10B is a bottom view of the L-angle member illustrated in FIG. 10A.
Figure 10C:
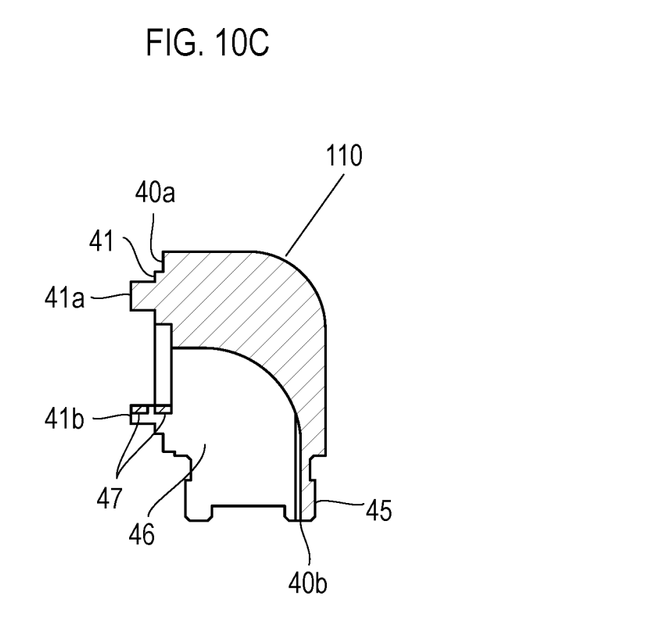
FIG. 10C is a sectional view of the L-angle member illustrated in FIG. 10A.
Figure 10D:
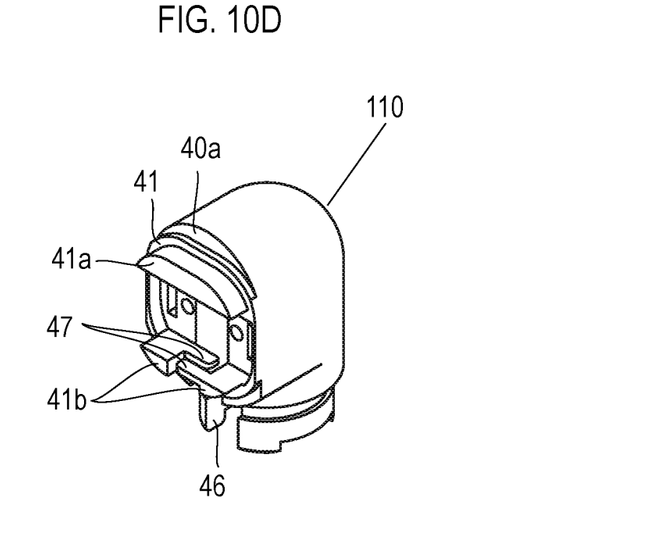
FIG. 10D is a perspective view of the L-angle member illustrated in FIG. 10A.
Figure 11A:
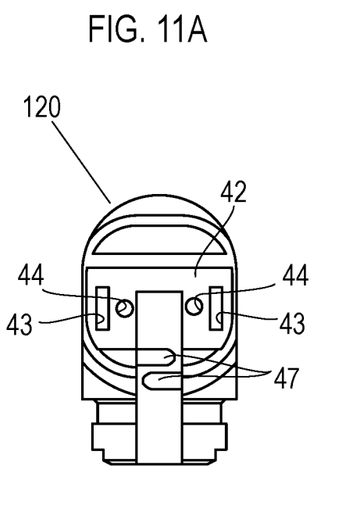
FIG. 11A is a front view illustrating still another shape example (example 2) of the L-angle member.
Figure 11B:
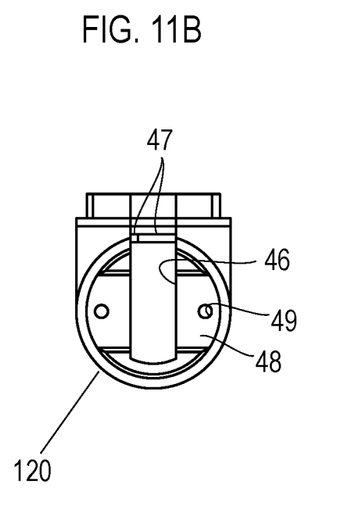
FIG. 11B is a bottom view of the L-angle member illustrated in FIG. 11A.
Figure 11C:
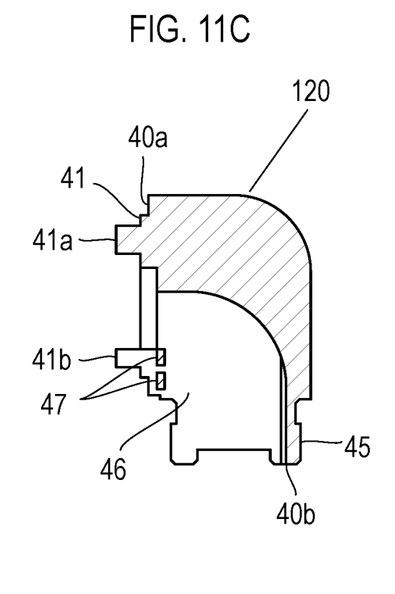
FIG. 11C is a sectional view of the L-angle member illustrated in FIG. 11A.
Figure 11D:
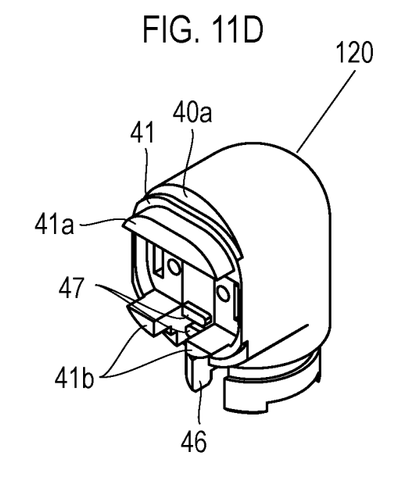
FIG. 11D is a perspective view of the L-angle member illustrated in FIG. 11A.
Figure 12A:
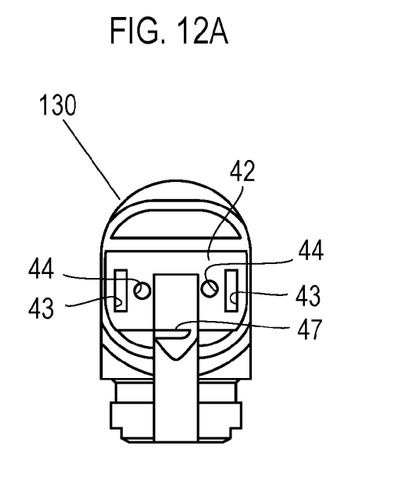
FIG. 12A is a front view illustrating yet another shape example (example 3) of the L-angle member.
Figure 12B:
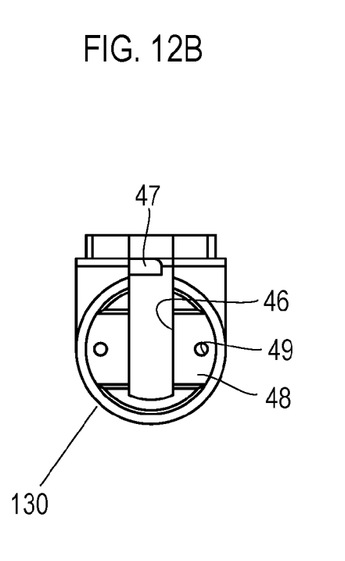
FIG. 12B is a bottom view of the L-angle member illustrated in FIG. 12A.
Figure 12C:
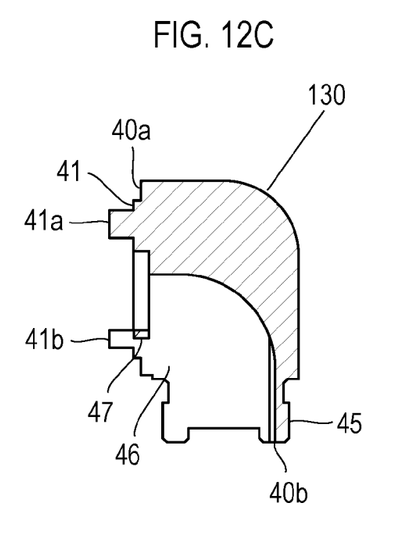
FIG. 12C is a sectional view of the L-angle member illustrated in FIG. 12A.
Figure 12D:
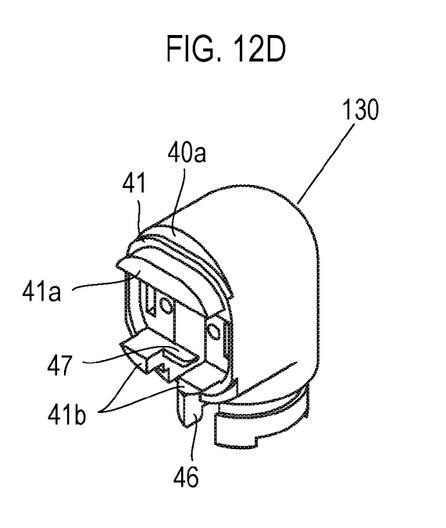
FIG. 12D is a perspective view of the L-angle member illustrated in FIG. 12A.

The sleeve 70 is constituted of a cylindrical portion 71 and an attaching portion 72 which is formed on one end of the cylindrical portion 71 in a protruded manner to have a flange shape, as illustrated in FIG. 9. The attaching portion 72 is shaped to be accommodated in the groove 48 of the other end surface 40b of the L-angle member 40 and attaching holes 73 are respectively formed on both ends in the longitudinal direction of the attaching portion 72. On an outer circumferential surface of the cylindrical portion 71, a plurality of protruded portions 74 which have an annular shape are formed to be arranged in an axial direction, as illustrated in FIG. 9.

The structures of respective principal components have been described above. Assembling of the L-angle type optical connector is now described in order.

(1) First, the sheath 201 of the optical cable 200 is cut off and removed by a predetermined length to expose optical fiber core wires 202. In this example, the optical cable 200 has eight optical fiber core wires 202.

(2) The optical cable 200 is sequentially put through the boot 100 and the crimping ring 80 having a cylindrical shape and the optical fiber core wires 202 are further put through the sleeve 70.

(3) Coating on tip portions of the optical fiber core wires 202 is removed to expose optical fiber element wires 203.

(4) Eight optical fiber element wires 203 are inserted from the concave portion 52 side of the ferrule 50 respectively to the fine holes 53 to be bonded and fixed and end surface polishing is performed.

(5) Then, the cylindrical portion 71 of the sleeve 70 is inserted between the inner circumferential surface of the sheath 201 and the eight optical fiber core wires 202 so as to position the attaching portion 72 of the sleeve 70 on an end of the sheath 201. Subsequently, the crimping ring 80 is positioned on the end portion of the sheath 201 to crimp the end portion of the sheath 201. Accordingly, the end portion of the sheath 201 is sandwiched and fixed between the cylindrical portion 71 of the sleeve 70 and the crimping ring 80.

(6) Then, the ferrule 50 is fitted into the rectangular hole 34 from the extended portion 33 side of the shell 30. The flange portion 51 of the ferrule 50 abuts against the step portion 34a in the rectangular hole 34.

(7) The shell 30 is attached to the L-angle member 40 in a state in which the coil spring 60 is inserted and positioned in each of a pair of circular concave portions 44 of the L-angle member 40. The step portion 41 of the L-angle member 40 is fitted between the protruded portions 36 and 37 of the shell 30 and the protruded portions 41a and 41b are fitted respectively into the concave portions 38 and 39 of the shell 30. On the other hand, a pair of protruded pieces 35a of the shell 30 is fitted into a pair of concave portions 43 of the L-angle member 40.

At this time, the optical fiber core wires 202 which are derived from the ferrule 50 are inserted into the cut-out 46 which is formed to span the entire length of the L-angle member 40 and rendered to pass through the gap between a pair of protrusions 47 so as to be accommodated in the back of the cut-out 46. Further, the attaching portion 72 of the sleeve 70 is positioned in the groove 48 which is provided on the other end surface 40b of the L-angle member 40.

The shell 30 and the L-angle member 40 are mutually fixed by bonding so as to be integrated. The end surface of the flange portion 51 of the ferrule 50 enters a state being pressed by a pair of coil springs 60.

(8) Next, the screws 90 are respectively put through two attaching holes 73 of the attaching portion 72 of the sleeve 70 and the screws 90 are respectively screwed into two screw holes 49 of the L-angle member 40. Accordingly, the sleeve 70 is screwed and fixed to the L-angle member 40 by two screws 90.

(9) The boot 100 is positioned around the shaft portion 45 of the L-angle member 40 and the crimping ring 80, and a protruded portion 101 which is annularly formed in a protruded manner on the end inner circumferential surface of the boot 100 is fitted into the concave portion 45a of the shaft portion 45 so as to fix the boot 100 on the L-angle member 40.

Accordingly, the L-angle type optical connector, which has the structure illustrated in FIGS. 4A to 4C and FIGS. 5A and 5B, for bending an optical fiber (the optical fiber core wire 202) in the right angle direction in wiring is completed.

According to the L-angle type optical connector described above, the L-angle member 40 which accommodates bent portions, which are bent in the right angle direction, of the optical fiber core wires 202 is constituted of one component, so that the number of components and the number of assembly steps can be reduced in comparison with a two component constitution as that of the conventional example illustrated in FIGS. 1A to 1C.

The L-angle member 40 has the cut-out 46 which is formed to span the entire length along the inside of the bent portions of the optical fiber core wires 202, so that the optical fiber core wires 202 can be easily put and accommodated in the L-angle member 40. Further, since the protrusions 47 are formed on the inner side surfaces which sandwich the cut-out 46 in a manner to be protruded to the cut-out 46, the optical fiber core wires 202 which are accommodated in the L-angle member 40 can be prevented from projecting out from the L-angle member 40. In particular, the optical fiber core wires 202 which are put in the L-angle member 40 are prone to project to the outside from the L-angle member 40 before the sleeve 70 is screwed and fixed to the L-angle member 40, but this projection can be prevented due to the presence of the protrusions 47.

The optical cable 200 in this example is configured to have the eight optical fiber core wires 202. However, in a case where there are a very large number of optical fiber core wires 202 such as 30 wires and 40 wires, the projection more easily occurs. Even in such case, the projection can be favorably prevented due to the presence of the protrusions 47.

Although the protrusions 47 are provided in a pair to be opposed to each other on the inner side surfaces which sandwich the cut-out 46 in the example described above, formation of the protrusions 47 is not limited to this. FIGS. 10A to 10D, FIGS. 11A to 11D, and FIGS. 12A to 12D illustrate other examples of formation of the protrusions 47.

In an L-angle member 110 illustrated in FIGS. 10A to 10D, although the protrusions 47 are respectively provided on both of the inner side surfaces which sandwich the cut-out 46, the protrusions 47 are provided to be arranged alternately in an extending direction of the cut-out 46. In an L-angle member 120 illustrated in FIGS. 11A to 11D, although the protrusions 47 are respectively provided on both of the inner side surfaces which sandwich the cut-out 46, the protrusions 47 are provided to be arranged alternately in a depth direction of the cut-out 46. Moreover, in an L-angle member 130 illustrated in FIGS. 12A to 12D, a single protrusion 47 is provided on one of the inner side surfaces which sandwich the cut-out 46. The protrusion 47 may be formed as illustrated in these FIGS. 10A to 10D, FIGS. 11A to 11D, and FIGS. 12A to 12D.

The protrusion 47 is provided on a corner portion or close to the corner portion of an L shape of the cut-out 46 which is cut to form the L shape as illustrated in these FIGS. 10A to 10D, FIGS. 11A to 11D, FIGS. 12A to 12D, and FIGS. 7A to 7F. By providing the protrusion 47 at such position, projecting out of the optical fiber core wires 202 can be more efficiently prevented.

Furthermore, if the protrusion 47 is provided on only one side of the L shape of the cut-out 46 which is cut to form the L shape as illustrated in FIGS. 7A to 7F, FIGS. 10A to 10D, FIGS. 11A to 11D, and FIGS. 12A to 12D, the L-angle member made of resin is easily molded and the manufacturing cost can be reduced. A plurality of protrusions 47 may be provided.

What is claimed is:

1. An L-angle type optical connector for bending an optical fiber in a right angle direction in wiring, wherein
    an L-angle member which accommodates a bent portion of the optical fiber has a cut-out spanning an entire length of the L-angle member along an inside of the bent portion, the bent portion being bent in the right angle direction,
    two or more protrusions are formed on both of inner side surfaces of the L-angle member in a protruded manner, the surfaces sandwiching the cut-out, and
    the two or more protrusions are provided on only one side of an L shape of the cut-out which is cut to form the L shape.

2. The L-angle type optical connector according to claim 1, wherein
    the two or more protrusions which are respectively provided to both of the inner side surfaces are provided to be opposed to each other.

3. The L-angle type optical connector according to claim 1, wherein
    the two or more protrusions which are respectively provided to both of the inner side surfaces are provided in a manner to be aligned in an extending direction of the cut-out.

4. The L-angle type optical connector according to claim 1, wherein
    the two or more protrusions which are respectively provided to both of the inner side surfaces are provided in a manner to be aligned in a depth direction of the cut-out.

5. The L-angle type optical connector according to claim 1, wherein
    the two or more protrusions are provided to a corner portion or close to the corner portion of the L shape of the cut-out which is cut to form the L shape.

6. The L-angle type optical connector according to claim 2, wherein
    the two or more protrusions are provided to a corner portion or close to the corner portion of the L shape of the cut-out which is cut to form the L shape.

7. The L-angle type optical connector according to claim 3, wherein
    the two or more protrusions are provided to a corner portion or close to the corner portion of the L shape of the cut-out which is cut to form the L shape.

8. The L-angle type optical connector according to claim 4, wherein
    the two or more protrusions are provided to a corner portion or close to the corner portion of the L shape of the cut-out which is cut to form the L shape.

* * * * *